(12) United States Patent
Takeda et al.

(10) Patent No.: US 10,217,988 B2
(45) Date of Patent: Feb. 26, 2019

(54) SECONDARY BATTERY

(71) Applicant: NEC ENERGY DEVICES, LTD., Sagamihara-shi, Kanagawa (JP)

(72) Inventors: Kouzou Takeda, Kanagawa (JP); Masaaki Matsuu, Kanagawa (JP); Hiroo Takahashi, Kanagawa (JP); Yoshimasa Yamamoto, Kanagawa (JP); Masanori Hirai, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 15/543,597

(22) PCT Filed: Jan. 26, 2016

(86) PCT No.: PCT/JP2016/052122
§ 371 (c)(1),
(2) Date: Jul. 14, 2017

(87) PCT Pub. No.: WO2016/121734
PCT Pub. Date: Aug. 4, 2016

(65) Prior Publication Data
US 2017/0373299 A1  Dec. 28, 2017

(30) Foreign Application Priority Data
Jan. 30, 2015 (JP) .................. 2015-016710

(51) Int. Cl.
*H01M 4/02* (2006.01)
*H01M 2/34* (2006.01)
(Continued)

(52) U.S. Cl.
CPC .............. *H01M 2/34* (2013.01); *H01M 4/02* (2013.01); *H01M 4/13* (2013.01); *H01M 10/04* (2013.01); *H01M 10/0585* (2013.01)

(58) Field of Classification Search
CPC combination set(s) only.
See application file for complete search history.

(56) References Cited

U.S. PATENT DOCUMENTS 4,254,191 A * 3/1981 Kniazzeh ................ H01M 2/12
156/253

FOREIGN PATENT DOCUMENTS

EP   3 012 898 A1   4/2016
JP   04-147573 A    5/1992
(Continued)

OTHER PUBLICATIONS

International Search Report for PCT/JP2016/052122, dated Apr. 12, 2016 [PCT/ISA/210].
(Continued)

*Primary Examiner* — Jacob B Marks
(74) *Attorney, Agent, or Firm* — Sughrue Mion, PLLC

(57) ABSTRACT

Provided is a secondary battery with a high electric characteristic and reliability that prevents the short circuit between a positive electrode and a negative electrode by an insulating member and that prevents or reduces the volume increase and deformation of a battery electrode assembly. A secondary battery includes a battery electrode assembly in which positive electrode 1 and negative electrode 6 are alternately laminated while separator 20 is interposed therebetween. Positive electrode 1 and negative electrode 6 include current collectors 3, 8 and active materials 2, 7, each surface of current collectors 3, 8 is provided with an application portion and a non-application portion of active materials 2, 8, and the active materials 2, 7 include a thin portion whose thickness is small. A charging capacity ratio A/C between negative electrode 6 and positive electrode 1 that face each other at an outer edge portion containing the thin portion is greater than the charging capacity ratio A/C between nega-
(Continued)

tive electrode 6 and positive electrode 1 that face each other at a center side with respect to the outer edge portion.

9 Claims, 9 Drawing Sheets

(51) Int. Cl.
*H01M 4/13* (2010.01)
*H01M 10/04* (2006.01)
*H01M 10/0585* (2010.01)

(56) References Cited

FOREIGN PATENT DOCUMENTS

| | | | |
|---|---|---|---|
| JP | 05-041251 A | | 2/1993 |
| JP | 5041251 A2 † | | 2/1993 |
| JP | 10092418 A2 † | | 4/1998 |
| JP | 2003-151535 A | | 5/2003 |
| JP | 2005277064 A | | 10/2005 |
| JP | 2006147392 A2 † | | 6/2006 |
| JP | 2010-205429 A | | 9/2010 |
| JP | 2012-164470 A | | 8/2012 |
| JP | 2014-211944 A | | 11/2014 |
| WO | 2012/124188 A1 | | 9/2012 |
| WO | 2013/176161 A1 | | 11/2013 |
| WO | 2014/136714 A1 | | 9/2014 |
| WO | 2014/203424 A1 | | 12/2014 |
| WO | 2014203424 A1 † | | 12/2014 |
| WO | 2015/019514 A1 | | 2/2015 |
| WO | 2015/129320 A1 | | 9/2015 |

OTHER PUBLICATIONS

Written Opinion for PCT/JP2016/052122, dated Apr. 12, 2016 [PCT/ISA/237].

Communication dated Jul. 11, 2018 from the European Patent Office in counterpart Application No. 16743337.4.

Communication dated Nov. 19, 2018 from the State Intellectual Property Office of the P.R.C. in counterpart Chinese application No. 201680007836.1.

\* cited by examiner
† cited by third party

SECONDARY BATTERY

CROSS REFERENCE TO RELATED APPLICATIONS

This application is a National Stage of International Application No. PCT/JP2016/052122 filed Jan. 26, 2016, claiming priority based on Japanese Patent Application No. 2015-016710 filed Jan. 30, 2015, the contents of all of which are incorporated herein by reference in their entirety.

TECHNICAL FIELD

The present invention relates to a secondary battery in which a positive electrode and a negative electrode are overlapped with a separator interposed therebetween.

BACKGROUND ART

There has been a wide proliferation of secondary batteries not only as power sources for portable devices such as mobile phones, digital cameras, and laptop computers, but also as power sources for vehicles and households. In particular, a lightweight lithium ion secondary battery with a high-energy density is an energy storage device that has become indispensable for daily life.

The secondary battery can be roughly categorized as a wound type or a laminated type. An electrode element of the wound-type secondary battery has a structure in which a long positive electrode sheet and a long negative electrode sheet are wound multiple times in overlapping relation with a separator interposed between each positive and negative electrode sheet. An electrode element of the laminated-type battery has a structure in which positive electrode sheets and negative electrode sheets are laminated alternately and repeatedly with separators respectively interposed therebetween. The positive electrode sheet and the negative electrode sheet each include an application portion (coating portion) that is formed by applying active material slurry (including a case of a mixture agent including a binding agent, a conductive material and the like in addition to the active material) on a current collector and drying it, and also include a non-application portion (non-coating portion) where the active material is not applied for the connection with an electrode terminal.

In each of the wound-type secondary battery and the laminated-type secondary battery, the battery electrode assembly is contained and sealed in an outer container (outer case), such that one end of a positive electrode terminal and one end of a negative electrode terminal are electrically connected with the non-application portion of the positive electrode sheet and the non-application portion of the negative electrode sheet respectively, and the other end of the positive electrode terminal and the other end of the negative electrode terminal extend from the outer container. Together with the battery electrode assembly an electrolyte is contained and sealed in the outer container. With yearly improvements in battery technology, the trend is for annual increases in the capacity of secondary batteries and for annual increases in the thickness of the electrode. What this means is that, should a short circuit occur, the amount of generated heat will increase which, in turn, increases safety risks. Therefore, measures to improve battery safety become more and more important.

In a lithium ion secondary battery described in Patent Document 1, during charge and discharge, the occlusion and release of lithium ions are performed between the positive electrode and the negative electrode that face each other. Then, it is known that the ratio between charging capacity A of the negative electrode and charging capacity C of the positive electrode is set such that A/C>1 holds, for preventing the deposition of lithium on the surface of the negative electrode.

Further, in Patent Document 2, as an example of a safety measure, there is known a technology of forming an insulating member on a border portion between the application portion and the non-application portion, to prevent the occurrence of a short circuit between the positive electrode and the negative electrode.

PRIOR ART DOCUMENTS

Patent Documents

Patent Document 1: JP5-41251A
Patent Document 2: JP2012-164470A

SUMMARY OF INVENTION

Problem to be Solved by the Invention

As described above, it is known that the charging capacity ratio is specified for the entire electrode in the lithium ion secondary battery described in Patent Document 1. Such a specification is sufficiently effective in the case where the application thickness is uniform over the entire electrode. However, if the electrode is thick, it takes a long time to dry the slurry including the active material. That is, if the average thickness of the electrode is large, a long time is required to sufficiently dry the slurry, and therefore, there is the possibility that the slurry will flow and spread at an edge portion of the slurry application portion before becoming sufficiently dry which would result in a non-uniform thickness. In the case of employing a negative electrode composed of a graphite material, if the coating weight of the negative electrode is less than 9 mg/cm$^2$, the slurry including the negative electrode active material can be dried while a desired form is kept, shortly after the slurry is applied. As a result, it is possible to form a negative electrode with a desired coating weight and a uniform thickness from the start edge portion to the end edge portion of the application portion. However, if the coating weight of the negative electrode is 9 mg/cm$^2$ or more, it takes a long time to dry the applied slurry. Therefore, the slurry cannot keep a desired form until being sufficiently dried, and flows and spreads. In particular, if the coating weight exceeds 18 mg/cm$^2$, a large amount of the slurry flows and spreads at the start edge portion of the application portion, so that the start edge portion of the application portion becomes thinner than the end edge portion. This is because of the viscosity characteristic of the slurry including the negative electrode active material.

When the battery is made using such a negative electrode with non-uniform thickness, the start edge portion of the application portion of the slurry, at which the coating weight is small, is thinner than the facing positive electrode, and therefore, it is not possible to intercalate all lithium in battery charging. As a result, lithium is deposited on the surface of the start edge portion of the negative electrode slurry, where the coating weight is small. In the battery in which lithium is deposited on the surface of the negative electrode, there is a risk that lithium dendrite growth may occur whenever the cycle of charge and discharge is repeated, and penetrates the separator, resulting in the short circuit between the positive electrode and the negative electrode. Therefore, there is a problem in that the safety of the battery is impaired.

Further, in the technology disclosed in Patent Document 2, as shown in FIG. 19, insulating member 40 covering border portion 4a between an application portion where active material 2 is applied and a non-application portion where active material 2 is not applied is formed on current collector 3 of positive electrode 1. In the laminated-type secondary battery, insulating members 40 are repeatedly laminated at the same position in planar view. Therefore, at the position where insulating member 40 is disposed, the thickness of the battery electrode assembly is large in part, and the energy density per unit volume decreases.

Further, in the secondary battery, to stabilize the electric characteristic and reliability, it is preferable to affix tape or the like to the battery electrode assembly and apply uniform pressure to the battery electrode assembly. However, when the insulating member in Patent Document 2 is used in the laminated-type secondary battery, it is not possible to apply uniform pressure to the battery electrode assembly due to the thickness difference between the portion where the insulating member is present and the portion where the insulating member is not present, and there is concern over causing a decrease in battery quality such as the variability in the electric characteristics and a decrease in cycle characteristics.

Hence, an object of the present invention is to solve the above problems, and to provide a high-quality secondary battery with a high electric characteristic and reliability that prevents the deposit of metal on the surface of the negative electrode and the occurrence of local bumps in the electrode due to the insulating member or the like.

Means to Solve the Problem

A secondary battery of the present invention including a battery electrode assembly in which a positive electrode and a negative electrode are alternately laminated while a separator is interposed therebetween, wherein each of the positive electrode and the negative electrode includes a current collector and an active material that is applied on the current collector, each surface of the current collector is provided with an application portion and a non-application portion, the application portion being a portion on which the active material is applied, the non-application portion being a portion on which the active material is not applied, and the active material includes a thin portion whose thickness is small, at least at a part of an outer edge portion of the application portion, and a charging capacity ratio A/C between the negative electrode and the positive electrode that face each other at the outer edge portion containing the thin portion is higher than the charging capacity ratio A/C between the negative electrode and the positive electrode that face each other at a center side with respect to the outer edge portion, the charging capacity ratio A/C being a ratio between a charging ratio A of the negative electrode and a charging ratio C of the positive electrode.

Advantageous Effects of Invention

According to the secondary battery in the present invention, it is possible to prevent or reduce an increase in the volume of the battery electrode assembly due to the insulating member and the distortion of the battery electrode assembly, and therefore, it is possible to provide a high-quality secondary battery with a good energy density.

BRIEF DESCRIPTION OF DRAWINGS

FIG. 6b is a plan view showing a positive electrode formed by cutting in the step shown in FIG. 6a.

FIG. 8b is a plan view showing a negative electrode formed by cutting in the step shown in FIG. 8a.

FIG. 10b is an enlarged cross-section view taken along line A-A in FIG. 10a.

FIG. 16b is a plan view showing a positive electrode formed by cutting in the step shown in FIG. 16a.

DESCRIPTION OF EXEMPLARY EMBODIMENTS

Hereinafter, exemplary embodiments of the present invention will be described with use of the drawings.

Figure 1:
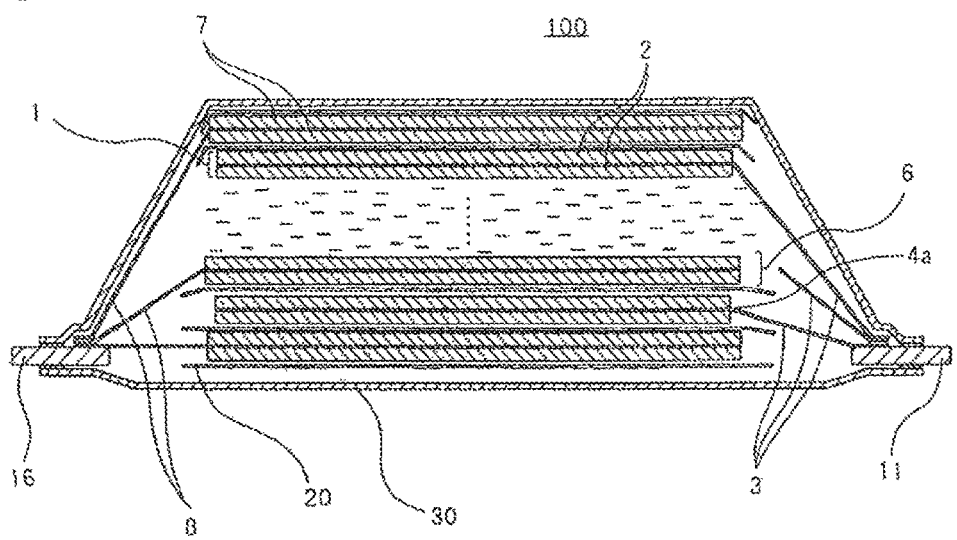
FIG. 1 is an outline cross-section view showing the basic structure of a laminated-type secondary battery in the present invention.

FIG. 1 schematically shows an example of the configuration of a laminated-type lithium ion secondary battery for which the present invention is employed. Lithium ion secondary battery 100 in the present invention includes an electrode laminated assembly (battery electrode assembly) in which positive electrodes (positive electrode sheets) 1 and negative electrodes (negative electrode sheets) 6 are alternately laminated with separators 20 interposed therebetween. The electrode laminated assembly is accommodated in an outer container made of flexible film 30, together with electrolyte. One end of positive electrode terminal 11 is connected with positive electrode 1 of the electrode laminated assembly, and one end of the negative electrode terminal 16 is connected with negative electrode 6. The other end of positive electrode terminal 11 and the other end of negative electrode terminal 16 each are led out of flexible film 30. In FIG. 1, the illustration of a part of the layers configuring the electrode laminated assembly (layers positioned at an intermediate portion in the thickness direction) is omitted, and electrolyte is illustrated.

Positive electrode 1 includes positive electrode current collector 3 and positive electrode active material layer 2 formed on positive electrode current collector 3, and on the front surface and back surface of positive electrode current collector 3, an application portion (coated portion) where positive electrode active material layer 2 is formed and a non-application portion (non-coated portion) where positive electrode active material layer 2 is not formed are positioned so as to be arrayed along the longitudinal direction. Similarly, negative electrode 6 includes negative electrode current collector 8 and negative electrode active material layer 7 formed on negative electrode current collector 8, and on the front surface and back surface of negative electrode current collector 8, the application portion and the non-application portion are positioned so as to be arrayed along the longitudinal direction.

Each non-application portion of positive electrodes 1 and negative electrodes 6 is used as a tab for the connection with the electrode terminal (positive electrode terminal 11 or negative electrode terminal 16). Positive electrode tabs connected with positive electrodes 1 are collected on positive electrode terminal 11, and are connected with each other by ultrasonic welding or the like, together with positive electrode terminal 11. Negative electrode tabs connected with negative electrodes 6 are collected on negative electrode terminal 16, and are connected with each other by ultrasonic welding or the like, together with negative electrode terminal 16. Then, an end of positive electrode terminal 11 and an end of negative electrode terminal 16 each are led out of the outer container.

Insulating member 40 for preventing the short circuit with negative electrode terminal 16 is formed so as to cover border portion 4a between the application portion and non-application portion of positive electrode 1. It is preferable that insulating member 40 be formed so as to cover border portion 4a across both the positive electrode tab (a portion of positive electrode current collector on which positive electrode active material layer 2 is not formed) and positive electrode active material 2. Forming insulating member 40 will be described below with reference to FIG. 2

The external dimensions of the application portion (negative electrode active material layer 7) of negative electrode 6 are larger than the external dimensions of the application portion (positive electrode active material layer 2) of positive electrode 1, and are smaller than the external dimensions of separator 20.

In the battery shown in FIG. 1, examples of positive electrode active material 2 include layered oxide materials such as $LiCoO_2$, $LiNiO_2$, $LiNi_{(1-x)}CoO_2$, $LiNi_x(CoAl)_{(1-x)}O_2$, $Li_2MO_3$-$LiMO_2$ and $LiNi_{1/3}Co_{1/3}Mn_{1/3}O_2$, spinel materials such as $LiMn_2O_4$, $LiMn_{1.5}Ni_{0.5}O_4$ and $LiMn_{(2-x)}M_xO_4$, olivine materials such as $LiMPO_4$, olivine fluoride materials such as $Li_2MPO_4F$ and $Li_2MSiO_4F$, and vanadium oxide materials such as $V_2O_5$, and mixtures of one kind or two or more kinds of these materials can be used. "M" means one or more element which includes a transition metal.

Examples of negative electrode active material 7 include carbon materials such as graphite, amorphous carbon, diamond-like carbon, fulleren, carbon nanotubes and carbon nanohorns, lithium metal materials, alloy materials of silicon, tin or the like, oxide materials such as $Nb_2O_5$ and $TiO_2$, or compounds of these materials can be used.

A binder, a conductive auxiliary agent or the like can be added to positive electrode active material 2 and negative electrode active material 7 when appropriate. As the conductive auxiliary agent, combinations of one kind or two or more kinds of carbon black, carbon fiber, graphite and the like can be used. Further, as the binder, polyvinylidene fluoride, polytetrafluoroethylene, carboxymethyl cellulose, modified acrylonitrile rubber particles or the like can be used.

As positive electrode current collector 3, aluminum, stainless steel, nickel, titanium, alloys of these materials, or the like can be used, and particularly, aluminum is preferable. As negative electrode current collector 8, copper, stainless steel, nickel, titanium, or alloys of these materials can be used.

Further, as electrolyte, mixtures of one kind or two or more kinds of organic solvents including cyclic carbonates such as ethylene carbonate, propylene carbonate, vinylene carbonate and butylene carbonate, chain carbonates such as ethyl methyl carbonate (EMC), diethyl carbonate (DEC), dimethyl carbonate (DMC) and dipropyl carbonate (DPC), aliphatic carboxylate esters, γ-lactones such as γ-butyrolactone, chain ethers, and cyclic ethers can be used. In the organic solvents, lithium salt may be dissolved.

Resin component of separator layer 20 can be a porous membrane, a woven fabric, an unwoven fabric or the like, and for example, polyolefin resins such as polypropylene and polyethylene, polyester resins, acrylic resins, styrene resins, nylon resins, and the like can be used. Particularly, polyolefin microporous membranes are preferable because of having excellent ion permeability and characteristics that enable physically separating the positive electrode and the negative electrode. Further, as necessary, a layer containing inorganic particles may be formed on separator layer 20. Examples of the inorganic particles include insulating oxides, nitrides, sulfides, carbides and others, and in particular, it is preferable that the layer contain $TiO_2$ or $Al_2O_3$.

As the outer container, a case formed of flexible film 30, a can case and the like can be used, and from the standpoint of reducing battery weight, it is preferable to use flexible film 30. As flexible film 30, a film in which resin layers are provided on the front surface and back surface of a metal layer which is a base can be used. As the metal layer, a metal layer having a barrier property for preventing the leakage of electrolyte and the intrusion of moisture from the outside can be selected, and aluminum, stainless steel and the like can be used. On at least one surface of the metal layer, a heat-adhesive resin layer of modified polyolefin or the like is provided. The heat-adhesive resin layers of flexible films 30 are provided so as to face each other, and the periphery of a portion where the electrode laminated assembly is accommodated is heat-sealed, so that the outer container is formed. Resin layers composed of a nylon film, a polyester film or the like may be provided on the outer container surface opposite to the surface on which the heat-adhesive resin layer is formed.

For positive electrode terminal 11, materials composed of aluminum or aluminum alloys can be used, and for negative electrode terminal 16, copper, copper alloys, nickel-plated copper or nickel-plated copper alloy, or the like can be used. Each of terminals 11, 16 is led out of the outer container. In each of terminals 11, 16, a heat-adhesive resin may be previously provided in a portion corresponding to the heat-welded portion of the outer periphery portion of the outer container.

For insulating member 40 formed so as to cover border portion 4a between the application portion and non-application portion of positive electrode active material 2, polyimide, glass fiber, polyester, polypropylene, or materials that contain them can be used. Insulating member 40 can be formed by welding a tape-like resin member on border portion 4a on heating, or by applying a gel-like resin on border portion 4a and then drying it.

Each of positive electrode active material 2 and negative electrode active material 7 includes a thin portion where the thickness is decreased by an incline or a step, at least at a part of an outer edge portion of the application portion. Then, the charging capacity ratio A/C between negative electrode 6 and positive electrode 1 that face each other at the portion (outer edge portion) containing the thin portion is set so as to be higher than the charging capacity ratio A/C between negative electrode 6 and positive electrode 1 at a position on the center side with respect to said portion (A is the charging capacity of negative electrode 6, and C is the charging capacity of positive electrode 1). Preferably, the average of the charging capacity ratio A/C at said portion (outer edge portion) containing the thin portion is 1.15 to 1.6, and the average of the charging capacity ratio A/C at the position on the center side with respect to said portion is 1.05 to 1.35.

Figure 2:
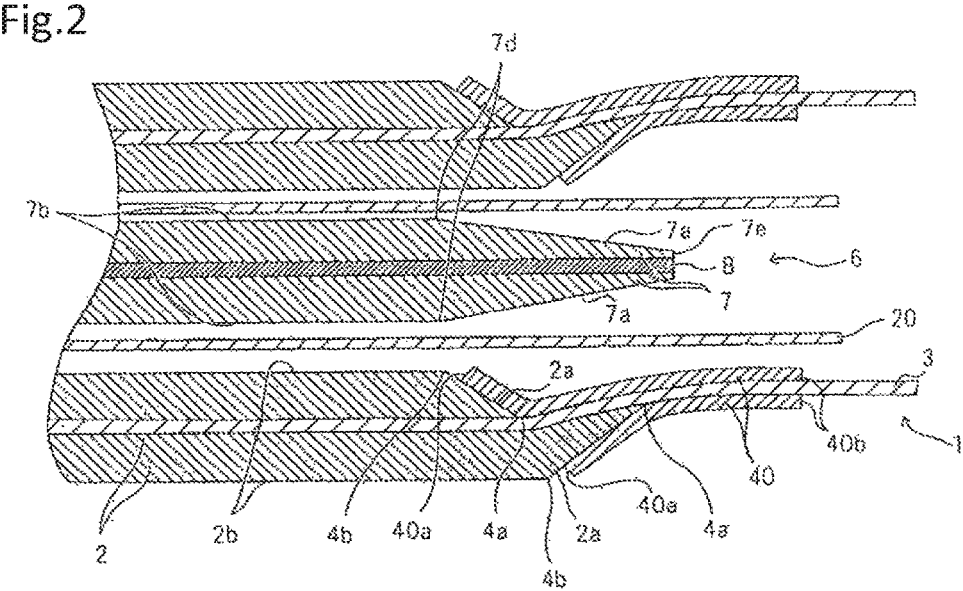
FIG. 2 is an enlarged cross-section view showing a principal part of an exemplary embodiment of the secondary battery in the present invention.

FIG. 2 is an outline cross-section view for describing an exemplary embodiment of the lithium ion secondary battery in the present invention, and a part of the electrode laminated body is enlarged and is schematically illustrated.

On both front and back surfaces of positive electrode current collector 3, the outer edge portion (the edge portion adjacent to the non-application portion) of the application portion of positive electrode active material 2 is incline portion 2a where the layer thickness of positive electrode active material 2 decreases continuously but gradually from flat portion 2b, that is, the thin portion, although the illustration is omitted in FIG. 1. One edge portion (the edge portion positioned on the layer of positive electrode active material 2) 40a of insulating member 40 is positioned on incline portion 2a.

As shown in FIG. 2, in the exemplary embodiment, at least a part of the application portion of active material 2 of positive electrode 1 is a single-side application portion where positive electrode active material 2 is applied only on one surface (the lower surface in FIG. 2). In other words, on the front and back surfaces of positive electrode current collector 3, border portions 4a between the application portions and non-application portions of positive electrode active materials 2 are formed at different planar positions, and a double-side application portion, a single-side application portion, a double-side non-application portion are arrayed in this order from the central portion (the left side in FIG. 2) of the electrode laminated body to the outer periphery portion.

Similarly, on both front and back surfaces of negative electrode current collector 8, the outer edge portion (the edge portion adjacent to the non-application portion) of the application portion of negative electrode active material 7 is incline portion 7a where the layer thickness of negative electrode active material 7 decreases continuously but gradually from flat portion 7b, that is, the thin portion. One edge portion 40a of insulating member 40, which is positioned on positive electrode active material 2, is positioned on incline portion 2a of positive electrode active material 2 as described above, and faces incline portion 7a of negative electrode active material 7. That is, one edge portion 40a of insulating member 40 is at a position which overlaps with incline portion 2a of positive electrode active material 2 and incline portion 7a of negative electrode active material 7 in a plane view. This means that edge portion 40a of insulating member 40 is positioned at a spot where the thicknesses of positive electrode active material 2 and negative electrode active material 7 are small. The thicknesses of positive electrode active material 2 and negative electrode active material 7 become smaller toward other edge portion 40b of insulating member 40, and insulating member 40 finally reaches a portion where positive electrode active material 2 and negative electrode active material 7 do not exist. Accordingly, insulating member 40 does not overlap with a portion where the thickness of positive electrode active material 2 or negative active material 7 is largest, and the increase in the thickness of the electrode laminated body due to insulating member 40 is prevented or reduced. In particular, as shown in FIG. 2, in the case where edge portion 40a of insulating member 40 is disposed on a portion that is in incline portions 2a, 7a of positive electrode active material 2 and negative electrode active material 7 and where the decreased amount of the thicknesses of positive electrode active material 2 and negative electrode active material 7 is equal to or greater than the thickness of insulating member 40, the increase in the thickness due to insulating member 40 is absorbed (offset) by the decrease in the thicknesses of positive electrode active material 2 and negative electrode active material 7, and therefore, the effect of preventing or reducing of the thickness increase is increased.

Figure 3:
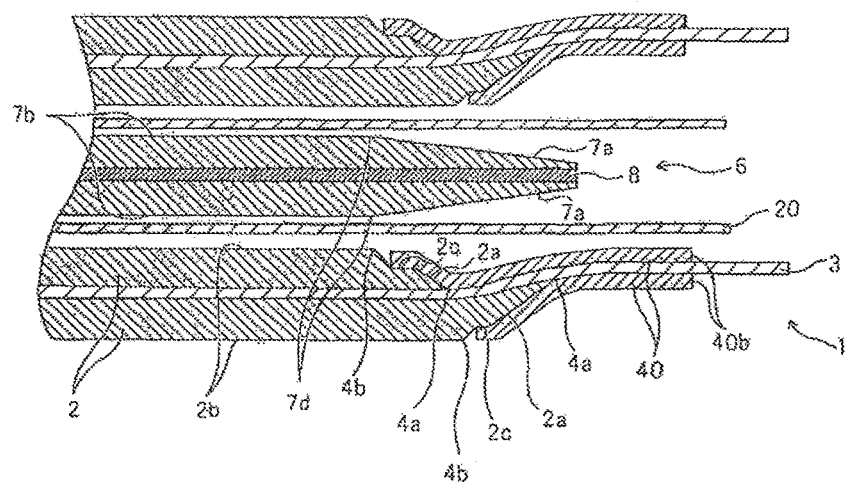
FIG. 3 is an enlarged cross-section view showing a modification of the secondary battery shown in FIG. 2.

Here, even in a configuration in which the thin portion is formed by providing, on positive electrode active material 2, step portion 2c where the thickness is decreased in a stepwise manner as shown in FIG. 3, instead of gentle incline portion 2a shown in FIG. 2, the same effect as the above effect is obtained, if insulating member 40 is disposed on the thin portion where the thickness of positive electrode active material 2 is decreased by step portion 2c. Similarly, negative electrode active material 7 may be provided with a step portion. Although both gentle incline portion 2a and step portion 2c are provided in the example shown in FIG. 3, it is permissible to provide only step portion 2c, or it is permissible to form multiple step portions 2c in staircase pattern.

The thin portions of positive electrode 1 and negative electrode 6, which are formed by the step portion or the incline portion, have manufacturing variations. In order to intercalate a sufficient amount of lithium at the time of charge, to prevent the depositing of lithium on the surface of the negative electrode and to ensure battery safety, even when the thin portion has such manufacturing variability, it is important that the A/C ratio at the thin portion be higher than the A/C ratio at the central portion.

Figure 4:
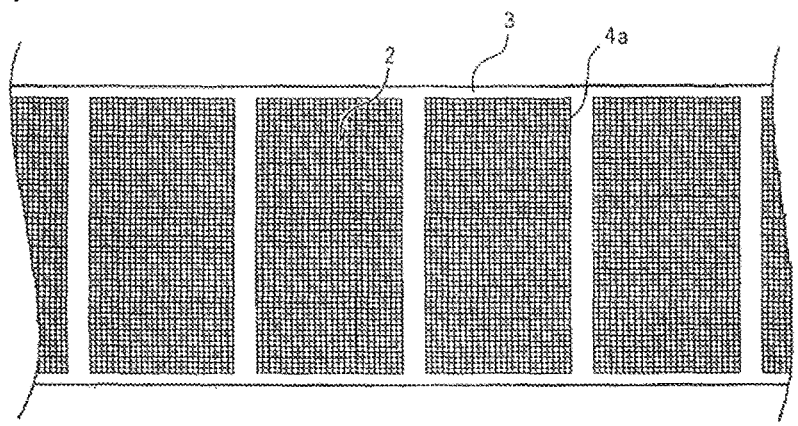
FIG. 4 is a plan view showing a positive electrode formation step in a production method for the secondary battery in the present invention.
Figure 5:
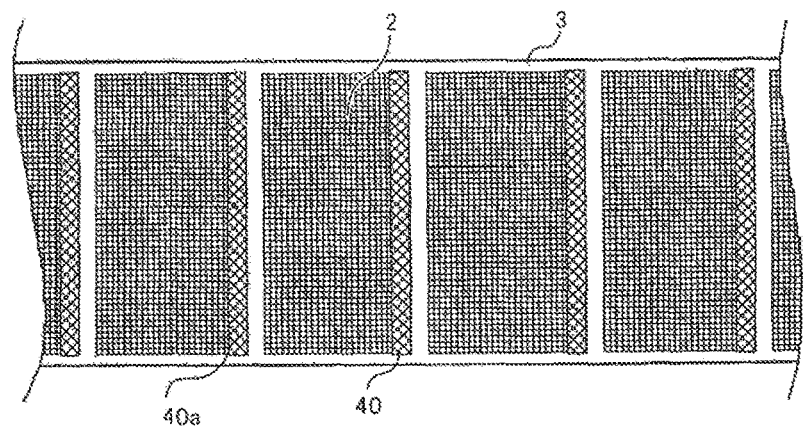
FIG. 5 is a plan view showing a step following FIG. 4 in the production method for the secondary battery in the present invention.

FIG. 4 and FIG. 5 are outline views showing states in middle of electrode preparation, for clearly explaining the positional relation of positive electrode 1, negative electrode 6, separator 20 and insulating member 40 of the laminated-type battery (laminate battery) shown in FIGS. 1 and 2.

FIG. 4 shows a state where positive electrode active material 2 is intermittently applied on the front surface of large-area positive electrode current collector 3 for producing multiple positive electrodes (positive electrode sheets) 1. Incline portion 2a (see FIG. 2) where the thickness is gradually decreased toward the outside, that is, the thin portion is formed at least at a part of an outer edge portion (specifically, an outer edge portion on the side to which positive electrode terminal 11 will be connected later) of each positive electrode active material 2. As shown in FIG. 5, insulating members 40 are respectively formed on the front surfaces of positive electrode active materials 2, such that one of the edges of 40a is respectively positioned on incline portions 2a and the other edge of 40b is respectively positioned on the non-application portions where positive electrode active materials 2 are not applied. Similarly, on the back surface of positive electrode current collector 3, positive electrode active material 2 is intermittently applied, and incline portion 2a where the thickness is gradually decreased toward the outside, that is, the thin portion is formed at least at a part of an outer edge portion (an outer edge portion on the side to which positive electrode terminal 11 will be connected) of each positive electrode active material 2. Insulating members 40 are respectively formed on the back surfaces of positive electrode active materials 2, such that one of the edges of 40a is respectively positioned on incline portions 2a and the other edge of 40b is respectively positioned on the non-application portions. As shown in FIG. 2, border portion 4a between the application portion and the non-application portion on the front surface of positive electrode active material 2 and border portion 4a between the application portion and the non-application portion on the back surface of positive electrode active material 2 are at different positions in planar view. That is, border portions 4a between the application portion and the non-application portion are different in position between the front surface and back surface of positive electrode active material 2.

If the thickness of insulating member 40 is small, there is concern that the insulation property cannot be sufficiently secured, and therefore, it is preferable that the thickness is 10 µm or greater. Further, if the thickness of insulating member 40 is excessively large, the effect of preventing or reducing the increase in the thickness of the electrode laminated body according to the present invention is not sufficiently achieved, and therefore, it is preferable that insulating member 40 is smaller than the thickness of flat portion 2b of positive electrode active material 2.

Further, it is preferable that the average of the A/C ratio does not fall below 1.15 at any point of the thin portion.

Figure 6A:
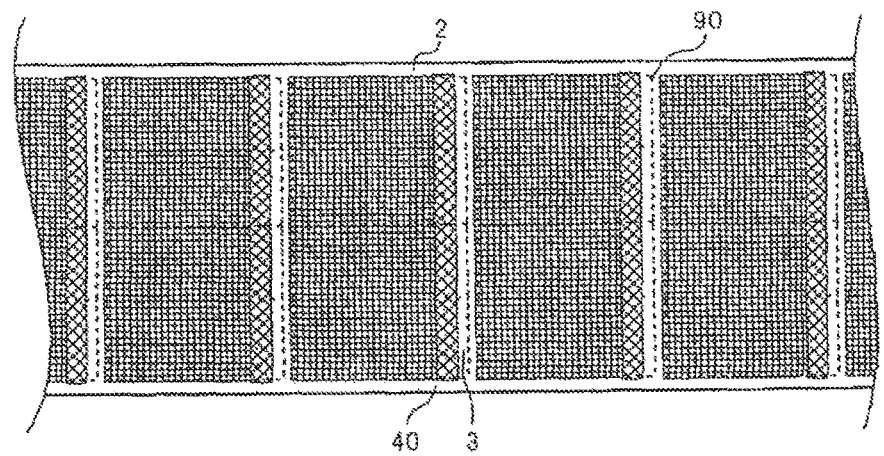
FIG. 6a is a plan view showing a step following FIG. 5 in the production method for the secondary battery in the present invention.
Figure 6B:
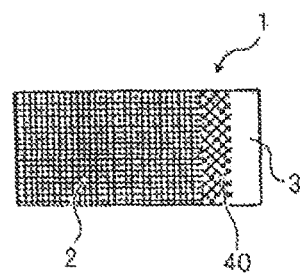

Thereafter, for obtaining positive electrode 1 that is used in an individual laminated-type battery, positive electrode current collector 3 is cut along cutting lines 90 shown by broken lines in FIG. 6a, to be divided, so that positive electrode 1 with a desired size shown in FIG. 6b is obtained. Cutting lines 90 are virtual lines, and are not actually formed.

Figure 7:
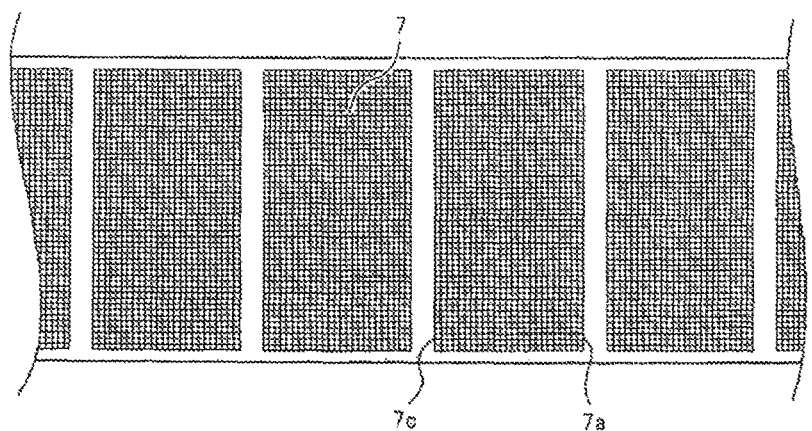
FIG. 7 is a plan view showing a negative electrode formation step in the production method for the secondary battery in the present invention.

FIG. 7 shows a state where negative electrode active material 7 is intermittently applied on the front surface of large-area negative electrode current collector 8 for producing multiple negative electrodes (negative electrode sheets) 6. Incline portion 7a where the thickness is gradually decreased toward the outside, that is, the thin portion is formed at least at a part of an outer edge portion (specifically, an outer edge portion on the side to which negative electrode terminal 16 will be connected later) of each negative electrode active material 7. Incline portion 7c may be provided at the outer edge portion on the opposite side of incline portion 7a, but incline portion 7c does not need to be provided. Insulating member 40 is not provided on negative electrode current collector 8 and negative electrode active material 7. As shown in FIG. 2, negative electrode active material 7 is similarly formed on both the front and back surfaces of negative electrode current collector 8. The non-application portion where negative electrode active material 7 is not formed is provided at the outer edge portion of negative electrode 6 on the opposite side of incline portion 7a. This non-application portion, which is not illustrated in FIG. 2, FIG. 3 and the like, serves as a negative electrode tab to which negative electrode terminal 16 is connected.

Figure 8A:
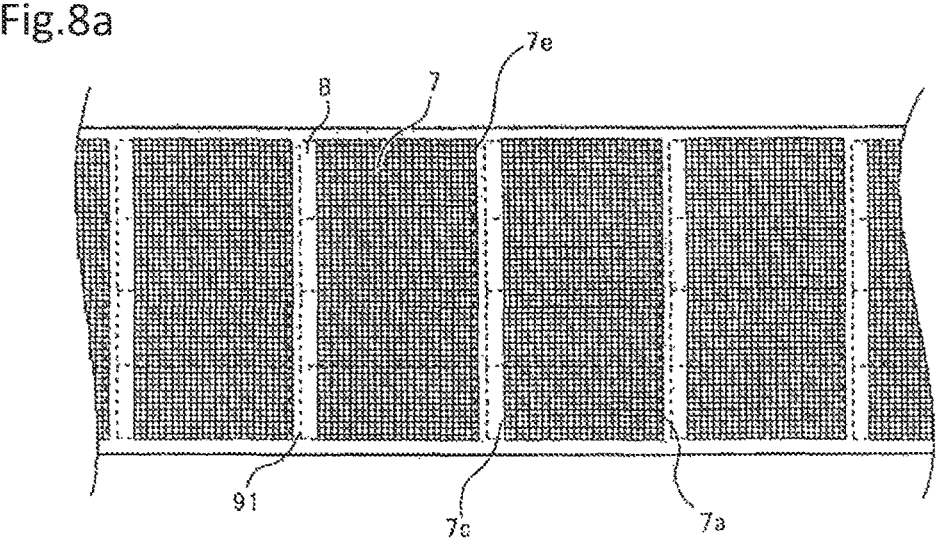
FIG. 8a is a plan view showing a step following FIG. 7 in the production method for the secondary battery in the present invention.
Figure 8B:
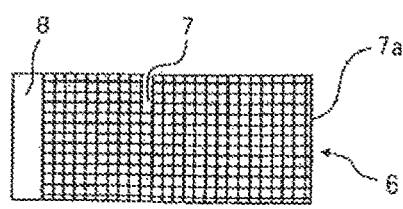

Thereafter, for obtaining negative electrode 6 that is used in an individual laminated-type battery, negative electrode current collector 8 is cut along cutting lines 91 shown by broken lines in FIG. 8a, to be divided, so that negative electrode 6 with a desired size shown in FIG. 8b is obtained. Cutting lines 90 are virtual lines, and are not actually formed.

Positive electrode 1 shown in FIG. 6b and negative electrode 6 shown in FIG. 8b, which are formed as described above, are alternately laminated while separator 20 is provided therebetween, and positive electrode terminal 11 and negative electrode terminal 16 are connected, so that the electrode laminated body shown in FIG. 2 is formed. Here, the electrode laminated body shown in FIG. 3 can be formed also by forming positive electrode active material 2 such that step portion 2c is provided instead of incline portion 2a or together with incline portion 2a, and in the other steps, performing the same steps as the above steps.

The electrode laminated body, together with an electrolyte, is contained in an outer container formed of flexible film 30, and the sealing is performed, so that secondary battery 100 shown in FIG. 1 is formed. In secondary battery 100 in the present invention that is formed in this way, one edge portion 40a of insulating member 40 is positioned on incline portion 2a (step portion 2c in some cases) of positive electrode active material 2, and faces incline portion 7a of negative electrode active material 7.

According to secondary battery 100, the increase in thickness due to insulating member 40 formed so as to cover border portion 4a between the application portion and non-application portion of positive electrode 1 is absorbed (offset) by the decrease in thickness due to incline portion 2a (step portion 2b in some cases) of positive electrode active material 2 and the decrease in thickness due to incline portion 7a of negative active material 7, and the thickness of the electrode laminated body is not partially increased. Therefore, it is possible to hold the electrode laminated body while uniformly pressing the electrode laminated body, and it is possible to prevent or reduce the decrease in quality such as variability in electric characteristic and a decrease in cycle characteristic.

Here, it is preferable that one edge portion 40a of insulating member 40 is positioned at such a position that the total of the thickness of positive electrode active material 2 and the thickness of insulating member 40 at the portion where edge portion 40a is positioned is equal to or less than the thickness of the portion (flat portion 2b) other than incline portion 2a of positive electrode active material 2. Thereby, compared to the configuration in the related art, thinning can be achieved roughly by a thickness equivalent to two insulating members 40 with respect to one positive electrode 1.

Further, to obtain efficient thinning, it is preferable that the total of the thickness of insulating member 40, the thickness of positive electrode active material 2 at the portion where edge portion 40a of insulating member 40 is positioned, and the thickness of negative electrode active material 7 at the portion that faces edge portion 40a of insulating member 40 be equal to or less than the total of the thickness of flat portion 2b of positive electrode active material 2 and the thickness of flat portion 7b of negative electrode active material 7.

By providing incline portion 7a also on negative electrode 6, it is possible to further decrease the possibility of the occurrence of the battery distortion that is caused by insulating member 40 provided on positive electrode 1. Preferably, insulating member 40 whose one edge portion 40a is positioned on incline portion 2a of positive electrode active material 2 is formed such that the total thickness of insulating member 40 and positive electrode active material 2 at the portion where edge portion 40a is positioned does not exceed the thickness of flat portion 2b of positive electrode active material 2. However, there are cases where it is permissible to exceed the thickness of flat portion 2b because of manufacturing variations, if incline portion 7a of negative electrode active material 7 can absorb the increase in thickness due to manufacturing variations of positive electrode 1.

Further, as shown in FIG. 2, it is preferable that border portion 4a on the back surface be positioned so as to deviate to the single-side application portion side with respect to border portion 4a on the front surface, to prevent or reduce an increase in thickness due to insulating member 40 and smoothing positive electrode 1 by a gentle curve of positive electrode active material 2 at the single-side application portion of positive electrode 1. Preferably, the deviation amount is at least five times the thickness of insulating member 40, and more preferably, the deviation amount is at least ten times the thickness of insulating member 40.

As shown in FIG. 2, transition position 7d between flat portion 7b and incline portion 7a of negative electrode active material 7 is positioned at the central portion side (the left side in FIG. 2), that is, at the side of flat portion 2b of positive electrode active material 2, with respect to edge portion 40a of insulating member 40 that is positioned on incline portion 2a of positive electrode active material 2 on the front surface of positive electrode current collector 3. Then, transition position 4b between flat portion 2b and incline portion 2a of positive electrode active material 2 on the front surface side and transition position 7d between flat portion 7b and incline portion 7a of negative electrode active material 7 are disposed so as the be roughly identical in planar view across separator 20.

In the example shown in FIG. 8b, at a position facing a double-side non-application portion (positive electrode tab) of positive electrode 1, a double-side application portion of negative electrode 6 is cut and terminated (termination portion 7e). As shown in FIG. 2, negative electrode active material 8 is present on the front and back of negative electrode current collector 8, and the single-side application portion and double-side non-application portion are not present.

However, it is permissible to adopt a configuration in which the double-side non-application portion is present on negative electrode 6. In that case, the planar positions of the border portions between the application portions and the non-application portions do not need to be different between the front and back of negative electrode current collector 7. However, as necessary, the planar positions of the border portions may be different between the front and back of negative electrode current collector 7, and insulating member 40 may be provided, similarly to positive electrode 1. In that case, it is preferable that one edge portion 40a of insulating member 40 be positioned on incline portion 7a. That is, to make the border portions between the application portions and the non-application portions separate in planar position between the front surface and back surface of negative electrode current collector 8, in other words, the configuration in which the double-side application portion, the single-side application portion and the double-side non-application portion are disposed so as to be arrayed in the longitudinal direction and the configuration in which the insulating member is provided on the border portion may be employed for only positive electrode 1, may be employed for only negative electrode 6, or may be employed for both positive electrode 1 and negative electrode 6.

The thickness, distance or the like of each member in the present invention, unless otherwise mentioned, means the average value of three or more values that are measured at arbitrary points.

The positions of the flat portions and incline portions 2a, 7a of positive electrode active material 2 and negative electrode active material 7, and the like are not limited to the configuration shown in FIGS. 2 and 3, and can be modified variously. Some of the modifications will be exemplified in Examples described later

EXAMPLES

Example 1

The lithium ion secondary battery was produced in accordance with the production method described with reference to FIGS. 4 to 8b.

<Positive Electrode>

First, a mixed active material of $LiMn_2O_4$ and $LiNi_{0.8}Co_{0.1}Al_{0.1}O_2$ was used as the positive electrode active material, carbon black was used as a conductive agent, and PVdF was used as a binder. Slurry in which a mixture agent of them was dispersed in an organic solvent was prepared. As shown in FIG. 4, the slurry was intermittently applied on one surface of positive electrode current collector 3 mainly composed of aluminum with a thickness of 20 μm, and was dried, so that positive electrode active material 2 with a thickness of 80 μm was formed. Because of the intermittent application of positive electrode active material 2, the application portion and non-application portion of positive electrode active material 2 exist alternately along the longitudinal direction of positive electrode current collector 2. On the other surface of positive electrode current collector 3, positive electrode active material 2 with a thickness of 80 μm was formed, such that border portion 4a between the application portion and non-application portion of positive electrode active material 2 deviated from border portion 4a on the one surface to the inside by 2 mm. The application portion of positive electrode active material 2 included flat portion 2b and incline portion 2a. Incline portion 2a was formed by applying the slurry such that the thickness was decreased from flat portion 2b toward the non-application portion.

A method for applying the active material on the current collector will be described. As the apparatus for applying the active material, apparatuses of performing various application methods such as transfer technique and evaporation technique, as exemplified by a doctor blade, a die coater and a gravure coater, can be used. In the present invention, it is particularly preferable to use the die coater, for controlling the position of the application edge portion of the active material. The active material application technique with the die coater falls roughly into two categories: a continuous application technique of forming continuously the active material along the longitudinal direction of the long current collector and an intermittent application technique of forming alternately and repeatedly the application and non-application portion of the active material along the longitudinal direction of the current collector.

Figure 9:
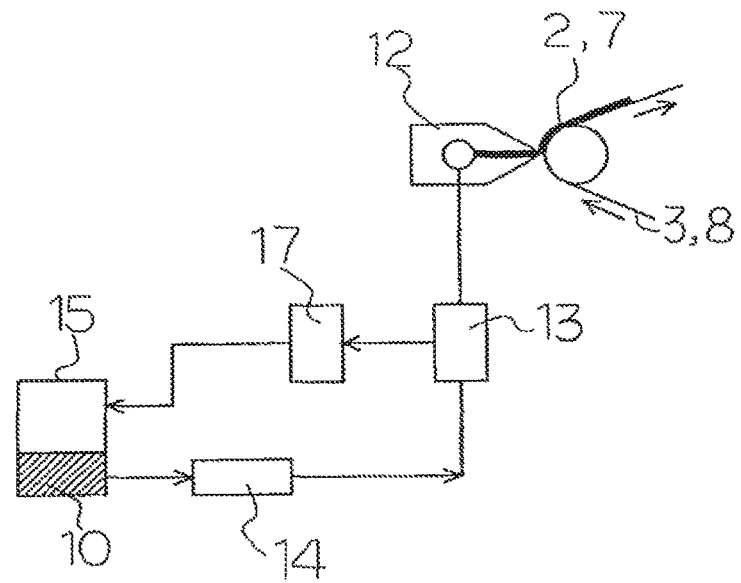
FIG. 9 is a block diagram schematically showing an exemplary apparatus that is used for intermittent application of active material.

FIG. 9 is a diagram showing an exemplary configuration of a die coater that performs the intermittent application. As shown in FIG. 9, on a slurry passage of the die coater that performs the intermittent application, there are die head 12, application valve 13 linked with die head 12, pump 14, and tank 15 in which slurry 10 is accumulated. Further, there is return valve 17 between tank 15 and application valve 13. In this configuration, it is preferable to use a motor valve, at least as application valve 13. The motor valve can accurately change the open-close state of the valve, even during the application of the slurry. Accordingly, when application valve 13 that is a motor valve controls the slurry passage and the like in cooperation with the action of return valve 17, it is possible to form the border portion between the application portion and non-application portion of the active material into a desired form.

Figure 10A:
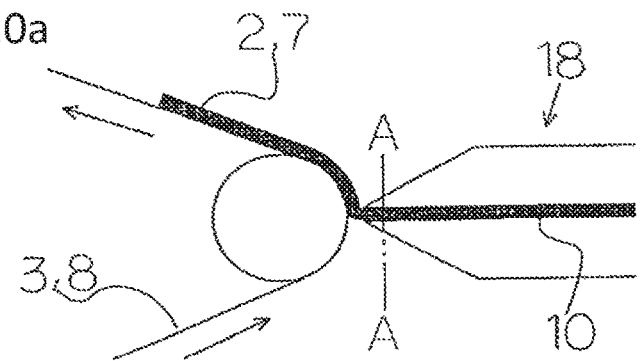
FIG. 10a is a cross-section view schematically showing an exemplary apparatus that is used for continuous application of active material.
Figure 10B:
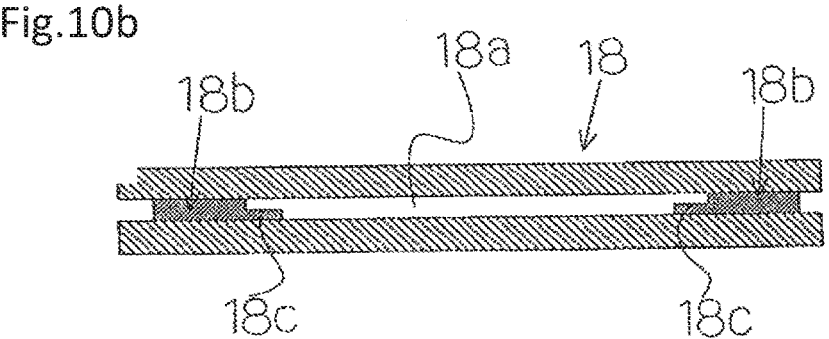

Further, the active material can be formed by performing the continuous application, using a die coater schematically shown in FIGS. 10a and 10b. Shims 18b including taper portions or step portions 18c where the thickness is decreased toward the central portion of discharge port 18a are provided at both edge portions of discharge port 18a of die head 18 of the die coater. By shim 18b, the active material can be formed such that the step portion or the incline portion is made at the edge portion of the application portion.

After positive electrode active material 2 was applied on positive electrode current collector 3 in this way, insulating tape (insulating member) 40 made of polypropylene and having a thickness of 30 μm was put so as to cover border portion 4a as shown in FIG. 5. At this time, insulating tape 40 provided so as to cover border portion 4a between the application portion (double-side application portion) and the non-application portion (single-side application portion) on the one surface of positive electrode active material 2 was formed such that edge portion 40a was positioned on incline portion 2a of positive electrode active material 2. Insulating tape 40 provided so as to cover border portion 4a on the other surface of positive electrode active material 2 was affixed such that edge portion 40a was positioned on incline portion 2a of positive electrode active material 2 on the other surface and insulating tape 40 covered border portion 4a on the other surface, which deviated from border portion 4a on the one surface to the inside or outside by 1 mm, and also covered a part of positive electrode current collector 3. Then, as shown in FIGS. 6a, 6b, the cutting was performed along cutting lines 90, so that individual positive electrodes 1 were obtained.

<Negative Electrode>

Graphite whose surface was coated with an amorphous material was used as negative electrode active material 7, PVdF was used as a binder, and slurry in which a mixture agent of negative electrode active material 7 and PVdF was dispersed in an organic solvent was prepared. As shown in FIG. 7, the slurry was intermittently applied on a copper foil with a thickness of 15 μm that is negative electrode current collector 8, and was dried. Then, similarly to positive electrode 1, a negative electrode roll including an application portion of negative electrode active material 7 and a non-application portion where negative electrode active material 7 was not applied was made. The specific application method for negative electrode active material 7 is the same as the application method for positive electrode active material 2 described above, and the intermittent application using the die coater shown in FIG. 9 may be adopted, or the continuous application using the die coater shown in FIGS. 10a and 10b may be adopted.

Negative electrode active material 7 included flat portion 7b and incline portion 7a. Incline portion 7a was formed by applying the slurry such that the thickness was decreased from flat portion 7b toward the outer edge portion. Then, as shown in FIGS. 8a and 8b, the cutting was performed along cutting lines 91, so that individual negative electrodes 6 were obtained. Negative electrode 6 included a negative electrode tab that is the non-application portion of negative electrode active material 7, at a position that did not face the positive electrode tab, and negative electrode current collector 8 was cut at portions 7e that were at positions facing the positive electrode tabs and where negative electrode active materials 7 were present on both surfaces. The thickness of flat portion 7b of negative electrode active material 7 on one side was 55 μm, and the insulating member was not provided on the border portion between the application portion and non-application portion of negative electrode 6.

<Making of Laminated-Type Battery>

Obtained positive electrode 20 and negative electrode 21 were laminated while separator 20 made of polypropylene and having a thickness of 25 μm was provided therebetween, negative electrode terminal 16 and positive electrode terminal 11 were attached to this, and the resultant assembly was contained in an outer container formed of flexible film 30, so that a laminated-type battery with a thickness of 8 mm was obtained.

Negative electrode 6 was formed such that transition position 7d between flat portion 7b and incline portion 7a of negative electrode active material 7 at the position facing the positive electrode tab (the double-side non-application portion of positive electrode 1) was positioned at the side of flat portion 2b of positive electrode active material 2 with respect to edge portion 40a of insulating tape 40 provided on incline portion 2a of positive electrode active material 2 on one surface of positive electrode 1. Here, transition position 4b between flat portion 2b and incline portion 2a of positive electrode active material 2 and transition position 7d between flat portion 7b and incline portion 7a of negative electrode active material 7 were disposed so as to produce a portion where they are roughly identical in planar view across separator 20.

Each of positive electrode 1 and negative electrode 6 includes the thin portion where the thickness is decreased by an incline or a step, at least at a part of the outer edge portion of the application portion. Then, the charging capacity ratio A/C between negative electrode 6 and positive electrode 1 that face each other at the portion (outer edge portion) containing the thin portion is set so as to be higher than the charging capacity ratio A/C between negative electrode 6 and positive electrode 1 at a position on the center side with respect to said portion. Preferably, the charging capacity ratio A/C at said portion (outer edge portion) containing the thin portion is 1.3, and the charging capacity ratio A/C at the position on the center side with respect to said portion is 1.2. The weight and thickness of the active material per unit area of each current collector can be adjusted in the step of pressing the active material.

Example 2

Using a mixture agent of $LiMn_2O_4$ as the active material, carbon black as the conductive agent and PVdF as the binder, positive electrode active material 2 with a thickness of 35 µm was formed on each side of positive electrode current collector 3. Further, negative electrode active material 7 made of non-graphitizable carbon and having a thickness of 35 µm was formed on each side of negative electrode current collector 8. The other conditions such as the formation positions of active materials 2, 7 and insulating member 40 were the same as Example 1. Thereby, a laminated-type battery with a thickness of 3 mm was obtained.

Example 3

Edge portion 40a of insulating member 40 on positive electrode active material 2 of positive electrode current collector 3 was disposed so as to deviate from edge portion 4a of positive electrode active material 2 positioned on the opposite surface across positive electrode current collector 3 to the inside or outside by 0.3 mm. The others were the same as Example 1. Thereby, a laminated-type battery was obtained. The thickness of the obtained laminated-type battery was 8.1 mm.

Example 4

Border portion 4a between the application portion and non-application portion of positive electrode active material 2 on the other surface of positive electrode current collector 3 was disposed so as to deviate from border portion 4a on the one surface to the inside by 1 mm. The others were the same as Example 3. Thereby, a laminated-type battery was obtained. The thickness of the obtained laminated-type battery was 8.1 mm.

Example 5

Figure 11:
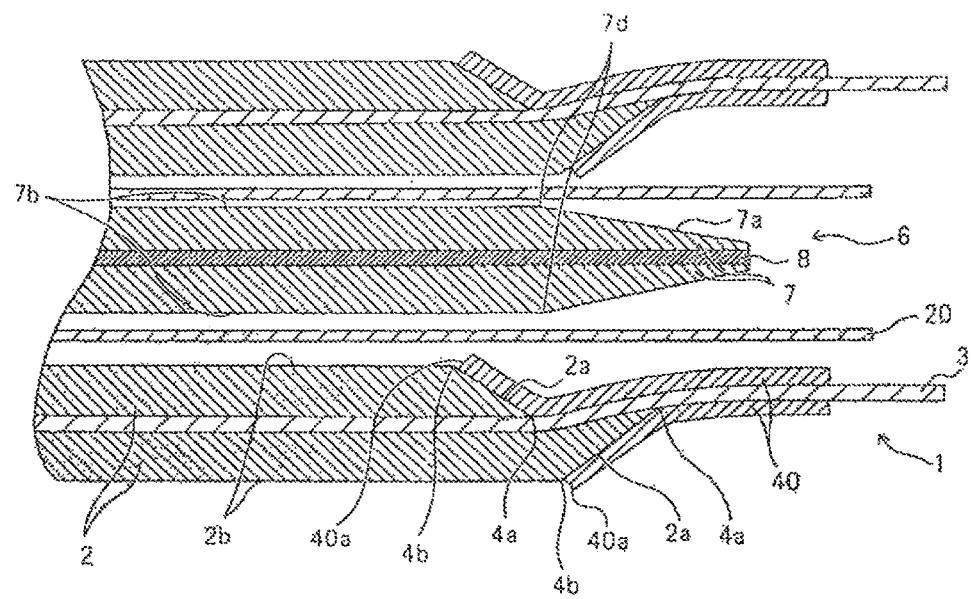
FIG. 11 is an enlarged cross-section view showing a principal part of an alternative exemplary embodiment of the secondary battery in the present invention.

In the example, as shown in FIG. 11, the position of incline portion 7a of negative electrode 6 is different from that in the example shown in FIG. 2. That is, in negative electrode 6, transition position 7d between flat portion 7b and incline portion 7a of negative electrode active material 7 at the position facing the positive electrode tab (the double-side non-application portion of positive electrode 1) is positioned at the side of flat portion 2b with respect to edge portion 40a of insulating tape 40 on incline portion 2a of positive electrode active material 2 on the other surface of positive electrode 1, and is positioned at the side of incline portion 2a with respect to edge portion 40a of insulating tape 40 on incline portion 2a of positive electrode active material 2 on the one surface of positive electrode 1. The others were the same as Example 1. Thereby, a laminated-type battery was obtained.

Example 6

Figure 12:
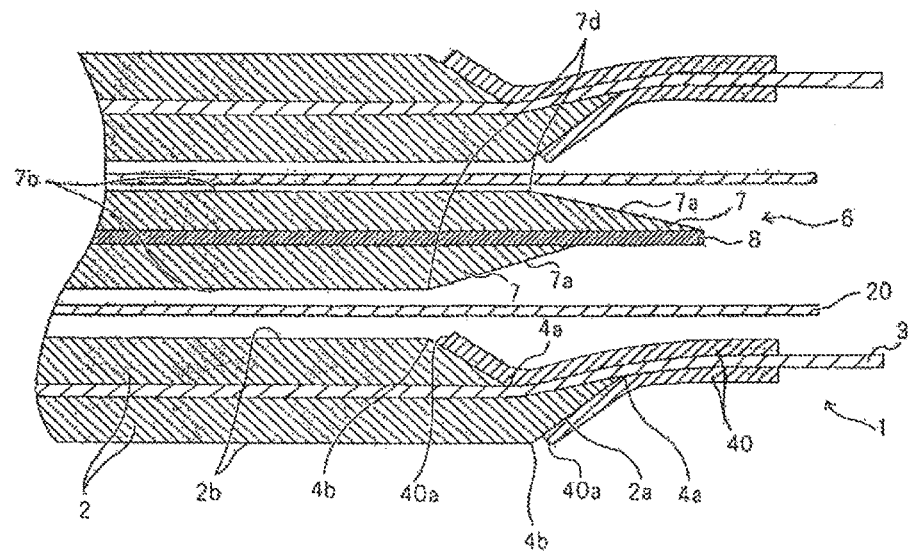
FIG. 12 is an enlarged cross-section view showing a principal part of a further alternative exemplary embodiment of the secondary battery in the present invention.

In the example, as shown in FIG. 12, transition positions 7d between flat portions 7b and incline portions 7a of negative electrode active materials 7 were disposed at positions that were different between the front and back of negative electrode current collector 8. Transition position 7d on the front surface of negative electrode current collector 8 was disposed so as to be identical in planar view to transition position 4b between flat portions 2b and incline portions 2a of positive electrode active materials 2 directly facing the front surface of negative electrode current collector 8. Transition position 7d on the back surface of negative electrode current collector 8 was disposed so as to be identical in planar view to transition position 4b between flat portions 2b and incline portions 2a of positive electrode active materials 2 directly facing the back surface of negative electrode current collector 8. That is, transition position 7d between flat portion 7b and incline portion 7a of negative electrode active material 7 on the front surface of negative electrode current collector 8 was at a position that was identical in planar view to transition position 4b between flat portion 2b and incline portion 2a of positive electrode active material 2 on the back surface of positive electrode current collector 3, and transition position 7d between flat portion 7b and incline portion 7a of negative electrode active material 7 on the back surface of negative electrode current collector 8 was at a position that was identical in planar view to transition position 4b between flat portion 2b and incline portion 2a of positive electrode active material 2 on the front surface of positive electrode current collector 3. The others were the same as Example 1. Thereby, a laminated-type battery was obtained.

Example 7

Figure 13:
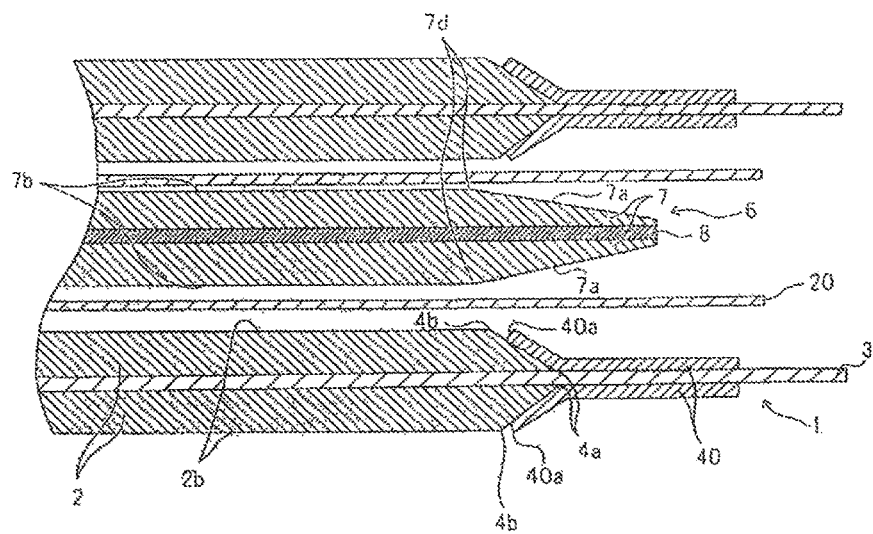
FIG. 13 is an enlarged cross-section view showing a principal part of a further alternative exemplary embodiment of the secondary battery in the present invention.
Figure 14:
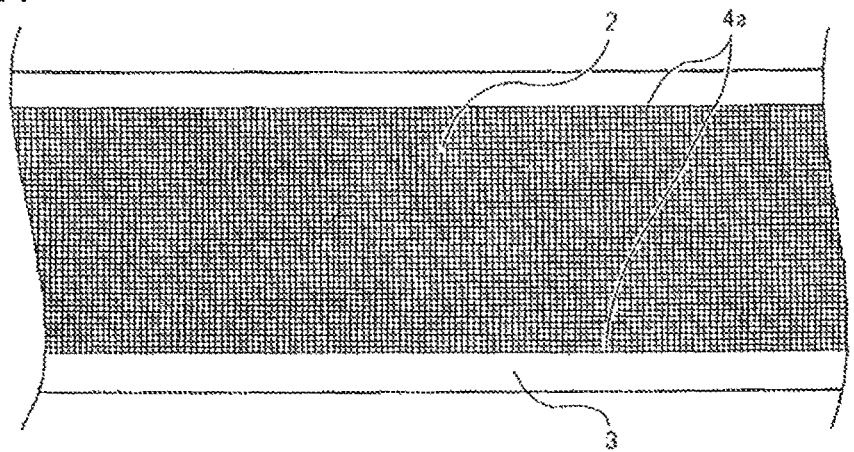
FIG. 14 is a plan view showing an alternative example of the positive electrode formation step in the production method for the secondary battery in the present invention.
Figure 15:
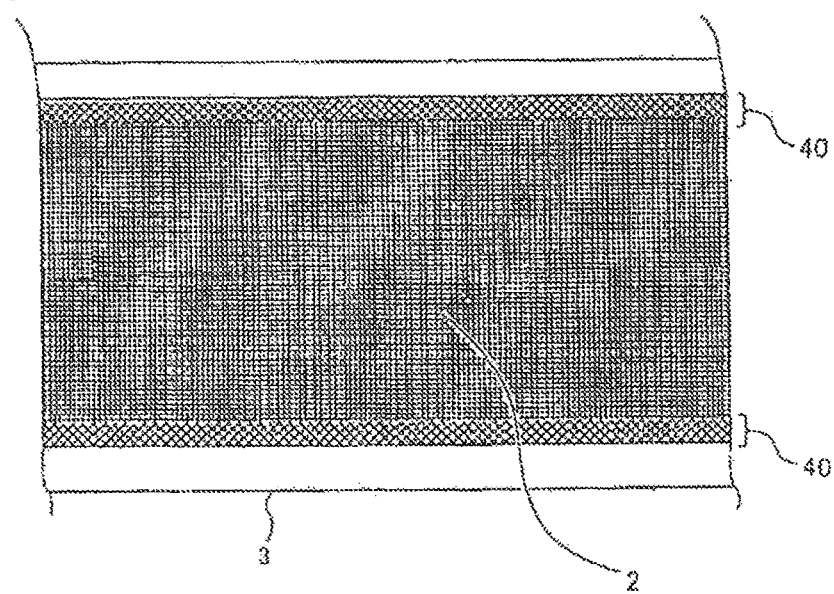
FIG. 15 is a plan view showing a step following FIG. 14 in the production method for the secondary battery in the present invention.
Figure 16A:
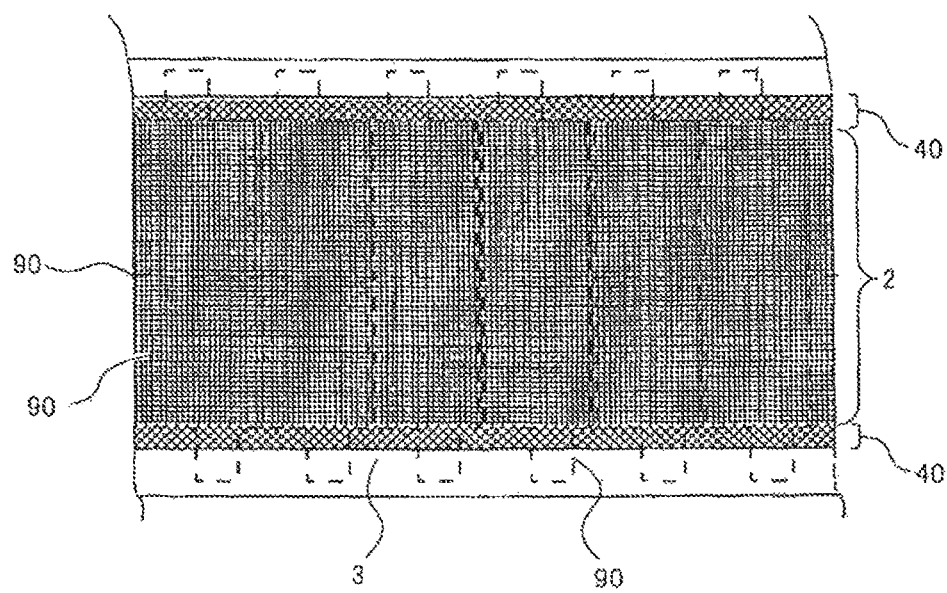
FIG. 16a is a plan view showing a step following FIG. 15 in the production method for the secondary battery in the present invention.
Figure 16B:
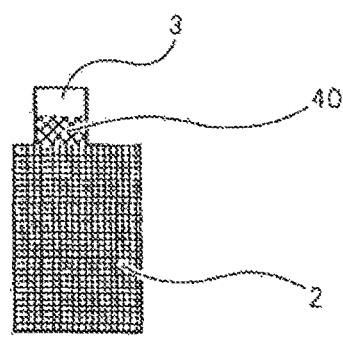

In the example, as shown in FIG. 13, transition positions 7d between flat portions 7b and incline portions 7a of negative electrode active materials 7 were disposed so as to be at the same position between the front and back of negative electrode current collector 8, and transition positions 7d were disposed so as to be identical in planar view to transition positions 4b between flat portions 2b and incline portions 2a of positive electrode active materials 2 on both front and back surfaces of positive electrode current collector 8. That is, transition positions 7d between flat portions 7b and incline portions 7a of negative electrode active materials 7 on both front and back surfaces of negative electrode current collector 8 and transition positions 4b between flat portions 2b and incline portions 2a of positive electrode active material 2 on both front and back surfaces of positive electrode current collector 3, all, were at an identical position in planar view. Accordingly, there was no difference between border position 4a between the application and non-application portions of positive electrode active material 3 on the front surface of positive electrode current collector 3 and border position 4a between the application and non-application portions of positive electrode active materials 3 on the back surface of positive electrode current collector 3. The others were the same as Example 1. Thereby, a laminated-type battery was obtained.

Comparative Example 1

Each of positive electrode active material 2 and negative electrode active material 7 was formed as a layer with a uniform thickness, and was configured to include only the flat portion and exclude the thin portion. Furthermore, edge portion 4a of the application portion of positive electrode active material 2 and edge portion 40a of insulating tape 40 were disposed so that there would be no difference between the front and back of positive electrode current collector 3. The others were the same as Example 1. Thereby, a laminated-type battery was obtained. The thickness of the laminated-type battery was 8.5 mm.

Comparative Example 2

Each of positive electrode active material 2 and negative electrode active material 7 was formed as a layer with a uniform thickness, and was configured to include only the flat portion and exclude the thin portion. Furthermore, edge portion 4a of the application portion of positive electrode active material 2 and edge portion 40a of insulating tape 40 were disposed so that there would be no difference between the front and back of positive electrode current collector 3. The others were the same as Example 2. Thereby, a laminated-type battery was obtained. The thickness of the laminated-type battery was 3.4 mm.

<Evaluation>

The discharge capacities and cycle characteristics of the laminated-type batteries obtained in this way were evaluated using ten batteries for each example. It was confirmed that very stable discharge capacities and cycle characteristics were obtained in the laminated-type batteries in Examples 1 to 7. In the batteries in Comparative Examples 1 and 2, the discharge capacities and the cycle characteristics were unstable compared to those of Examples 1 to 7. It is thought that the thickness at the portion where insulating member 40 is positioned in the laminated-type battery was prevented or reduced from increasing compared to the other portion and thereby the laminated-type battery could be held while being uniformly pressed, so that the battery characteristics became stable.

Here, in the present invention, the incline angle of incline portion 7a of negative electrode active material 7 does not always need to be constant, and can be arbitrarily set unless the capacity of negative electrode 6 is less than that of positive electrode 1 taking in consideration the capacity balance with facing positive electrode 1.

Figure 17:
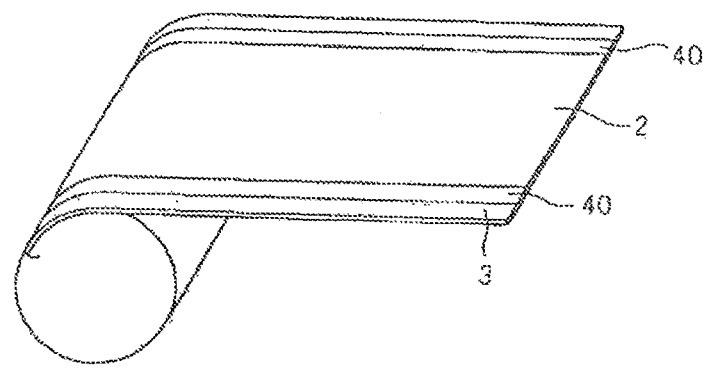
FIG. 17 is a plan view showing a step following FIGS. 16a, 16b in the production method for the secondary battery in the present invention.

In the above examples, positive electrode active material 2 and negative electrode active material 7 are formed by the intermittent application, but as shown in FIGS. 14 to 16b, may be formed by the continuous application by which active material layers with no void are formed over multiple electrode formation portions. In the case of forming the active material by continuous application, the electrode, as shown in FIG. 17, can be preserved as an electrode roll, before cutting along cutting lines 90 in FIG. 16a. In that case, it is possible to prevent or reduce extreme distortion at the portions where insulating members 40 are disposed, and therefore, it is possible to enhance the quality of the electrode.

As described above, in the present invention, the ratio A/C of charging capacity A of negative electrode active material 7 and charging capacity C of positive electrode active material 2, which negative electrode active material 7 and positive electrode active material 2 face each other at the outer edge portion containing thin portions 2a, 2c, 7a, is higher than charging capacity ratio A/C between negative electrode active material 7 and positive electrode active material 3 that face each other at the center side with respect to the outer edge portion. Thereby, even when there is manufacturing variability in thin portions 2a, 2c, 7a, it is possible to intercalate a sufficient amount of lithium during charge, and to prevent the deposition of lithium on the surface of negative electrode active material 7. Furthermore, it is thought that the specification of thin portion 7a of negative electrode active material 7 makes it possible to more surely prevent the depositing of lithium on the surface of negative electrode active material 7. That point will be described below.

Figure 18:
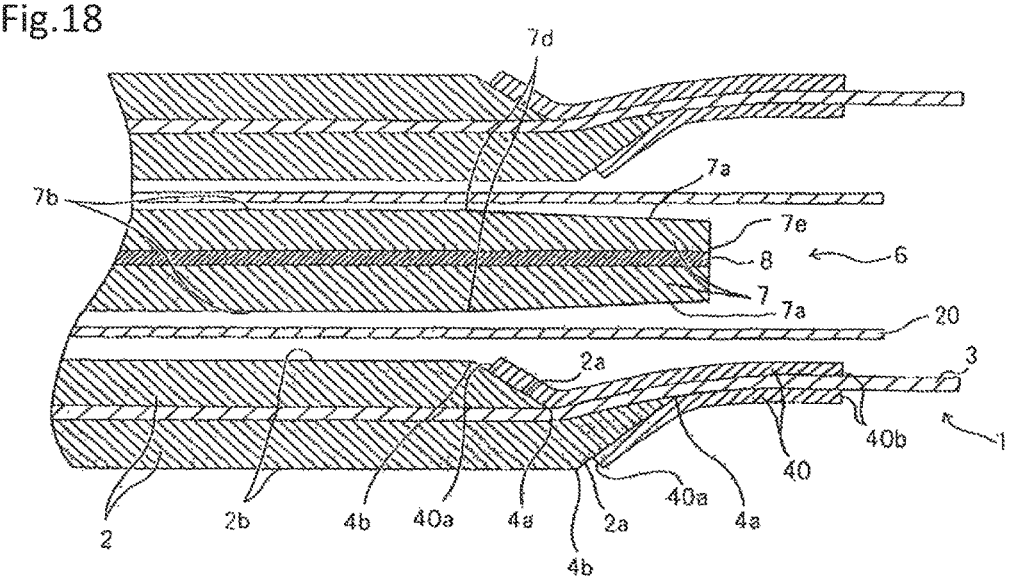
FIG. 18 is an enlarged cross-section view showing an alternative modification of the secondary battery shown in FIG. 2.
Figure 19:
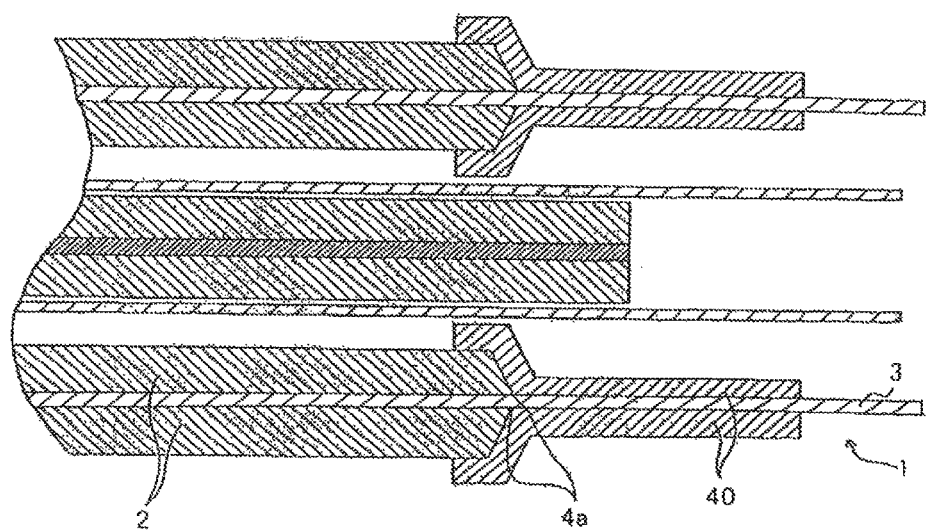
FIG. 19 is an enlarged cross-section view showing a principal part of a laminated-type secondary battery in the related art.

As described above, it is thought that the depositing of lithium on the surface of negative electrode active material 7 occurs because it is impossible to intercalate all lithium during charge, for example, in the case where negative electrode active material 7 is thinner than facing positive electrode active material 3. Accordingly, although depending on charging capacity, it is preferable that the thicknesses of the portions of negative electrode active material 7 are respectively greater than the thicknesses of the portions of positive electrode active material 3 that face the portions of negative electrode active material 7 across separator 20, because it is possible to intercalate all lithium and lithium is unlikely to be deposited on the surface of negative electrode active material 7. In an ordinary form, when the edge portion of thin portion 7a of negative electrode active material 7 is formed so as to have a thickness of about 75% to 95% of the thickness of flat portion 7b, negative electrode active material 7, even at the edge portion, is highly likely to be thicker than positive electrode active material 3 at the facing position. This edge portion is the edge portion on the non-application portion side of negative electrode active material 7, and is the application start edge portion or application termination edge portion of the active material. FIG. 18 shows a specific exemplary configuration in which thin portion 7a of negative electrode active material 7 is specified in this way. This is a modification of the configuration shown in FIG. 2, and the edge portion of thin portion 7a of negative electrode active material 7 has a thickness of about 80% of the thickness of flat portion 7b. According to the configuration, it is possible to further decrease the risk of depositing of lithium on the surface of negative electrode active material 7. In this case, thin portion 7a of negative electrode active material 7 is not very thin compared to flat portion 7b. Therefore, it is preferable that thin portion 2a of positive electrode active material 3 be thin enough to absorb (offset) the thickness of insulating member 40.

Further, when the charging capacity per unit area, coating weight and active material ratio at the edge portion on the non-application portion side of positive electrode active material 3 are C, β and c, respectively, and the charging capacity per unit area, coating weight and active material ratio of negative electrode active material 7 at the portion that faces said edge portion are A, α and a, respectively, it is preferable to be aαA>cβC. In the case where the relation is satisfied, it is possible intercalate a sufficient amount of lithium in negative electrode active material 7 during charge, leading to a reduction in the risk of depositing of lithium on the surface.

The present invention is useful for the production of an electrode of a lithium ion secondary battery and the production of a lithium ion secondary battery using the electrode, and is also effective in the application to secondary batteries other than the lithium ion battery.

Thus, the present invention has been described with reference to some exemplary embodiments. The present invention is not limited to the above configurations of the exemplary embodiments, and various modifications that can be understood by those skilled in the art can be performed in the configuration and detail of the present invention, within the scope of the technical idea of the present invention.

EXPLANATION OF REFERENCE NUMERAL

1 Positive electrode
2 Positive electrode active material
2a, 7a Incline portion
2c Step portion
Positive electrode current collector
4a Border portion
6 Negative electrode
7 Negative electrode active material
8 Negative electrode current collector
20 Separator
40 Insulating member
40a One edge portion
40b Other edge portion
100 Secondary battery

The invention claimed is:

1. A secondary battery comprising a battery electrode assembly in which a positive electrode and a negative electrode are alternately laminated while a separator is interposed therebetween, wherein
   each of said positive electrode and said negative electrode comprises a current collector and an active material that is applied on said current collector,
   each surface of said current collector is provided with an application portion and a non-application portion, said application portion being a portion on which said active material is applied, said non-application portion being a portion on which said active material is not applied, and
   said active material comprises a thin portion whose thickness is small, at least at a part of an outer edge portion of said application portion, and a charging capacity ratio A/C between said negative electrode and said positive electrode that face each other at the outer edge portion containing said thin portion is higher than the charging capacity ratio A/C between said negative electrode and said positive electrode that face each other at a center side with respect to the outer edge portion, the charging capacity ratio A/C being a ratio between a charging capacity A of said negative electrode and a charging capacity C of said positive electrode.

2. The secondary battery according to claim 1, wherein
   an insulating member is disposed so as to cover a border portion between said application portion and said non-application portion of said positive electrode, and
   in one or both of said insulating members respectively provided on both surfaces of said current collector of said positive electrode, one edge portion of said insulating member is positioned on said thin portion of said active material of said positive electrode and faces said thin portion of one or both of said active materials respectively formed on both surfaces of said current collector of said negative electrode, and the other edge portion of said insulating member is positioned on said non-application portion of said positive electrode.

3. The secondary battery according to claim 1, wherein a transition position between a flat portion and said thin portion of said negative electrode faces a transition position between a flat portion and said thin portion of said positive electrode, or faces said thin portion of said positive electrode, said positive electrode facing said negative electrode across said separator.

4. The secondary battery according to claim 1, wherein one edge portion of said insulating member is positioned on said thin portion of said active material of said positive electrode, and a total thickness of said insulating member, a thickness of said active material of said positive electrode at a portion where the one edge portion of said insulating member is positioned, and a thickness of said active material of said negative electrode at a portion that faces the one edge portion of said insulating member is equal to or less than a total thickness of a flat portion other than said thin portion of said active material of said positive electrode and a thickness of a flat portion other than said thin portion of said active material of said negative electrode.

5. The secondary battery according to claim 1, wherein a layer thickness of said active material formed on said current collector of said positive electrode is not less than 25 μm and not more than 100 μm, and a border portion between said application portion and said non-application portion on one surface of said current collector and a border portion between said application portion and said non-application portion on the other surface of said current collector are positioned so as to be 1.5 mm or more away from each other in planar position.

6. The secondary battery according to claim 1, wherein a thickness of an edge portion on said non-application portion side of said thin portion of said active material of said negative electrode is 75% to 95% of a thickness of a flat portion other than said thin portion of said active material of said negative electrode.

7. The secondary battery according to claim 1, wherein thicknesses of the portions of said active material of said negative electrode are respectively greater than thicknesses of the portions of said active material of said positive electrode that face the portions of said active material of said negative electrode across said separator.

8. The secondary battery according to claim 1, wherein when a charging capacity per unit area, a coating weight and an active material ratio at an edge portion on said non-application portion side of said active material of said positive electrode are C, β and c, respectively, and a charging capacity per unit area, a coating weight and an active material ratio for said active material 7 of said negative electrode at a portion that faces the edge portion are A, α and a, respectively, aαA>cβC holds.

9. The secondary battery according to claim 1, wherein the secondary battery is a lithium ion secondary battery.

* * * * *

UNITED STATES PATENT AND TRADEMARK OFFICE
CERTIFICATE OF CORRECTION

PATENT NO. : 10,217,988 B2
APPLICATION NO. : 15/543597
DATED : February 26, 2019
INVENTOR(S) : Kouzou Takeda et al.

It is certified that error appears in the above-identified patent and that said Letters Patent is hereby corrected as shown below:

In the Specification

Column 19, Explanation of Reference Numeral, Line 10; Delete "Positive" and insert --3 Positive-- therefor Signed and Sealed this
Thirtieth Day of July, 2019

Andrei Iancu
*Director of the United States Patent and Trademark Office*